Feb. 21, 1961 S. H. GORDON 2,972,672
ELECTRIC RESISTANCE WELDING MACHINES
Filed June 16, 1958 2 Sheets-Sheet 1
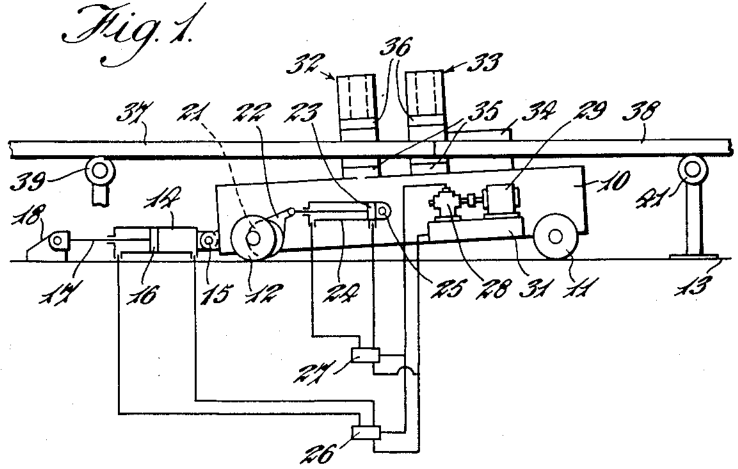
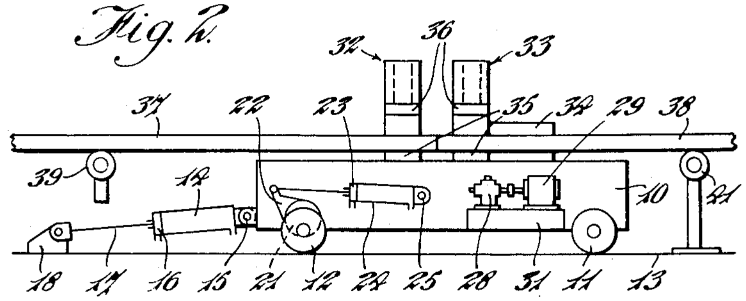
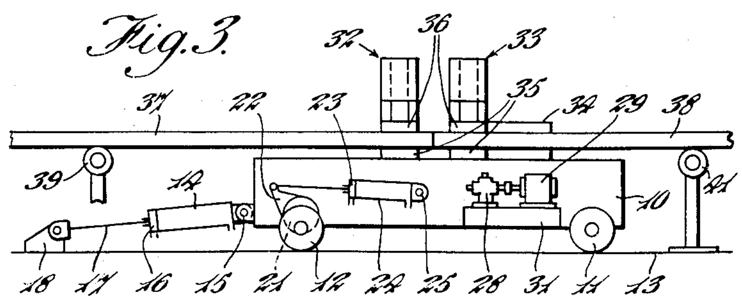
Inventor
Samuel Hunter Gordon
By Stevens Davis Miller + Mosher
attorneys

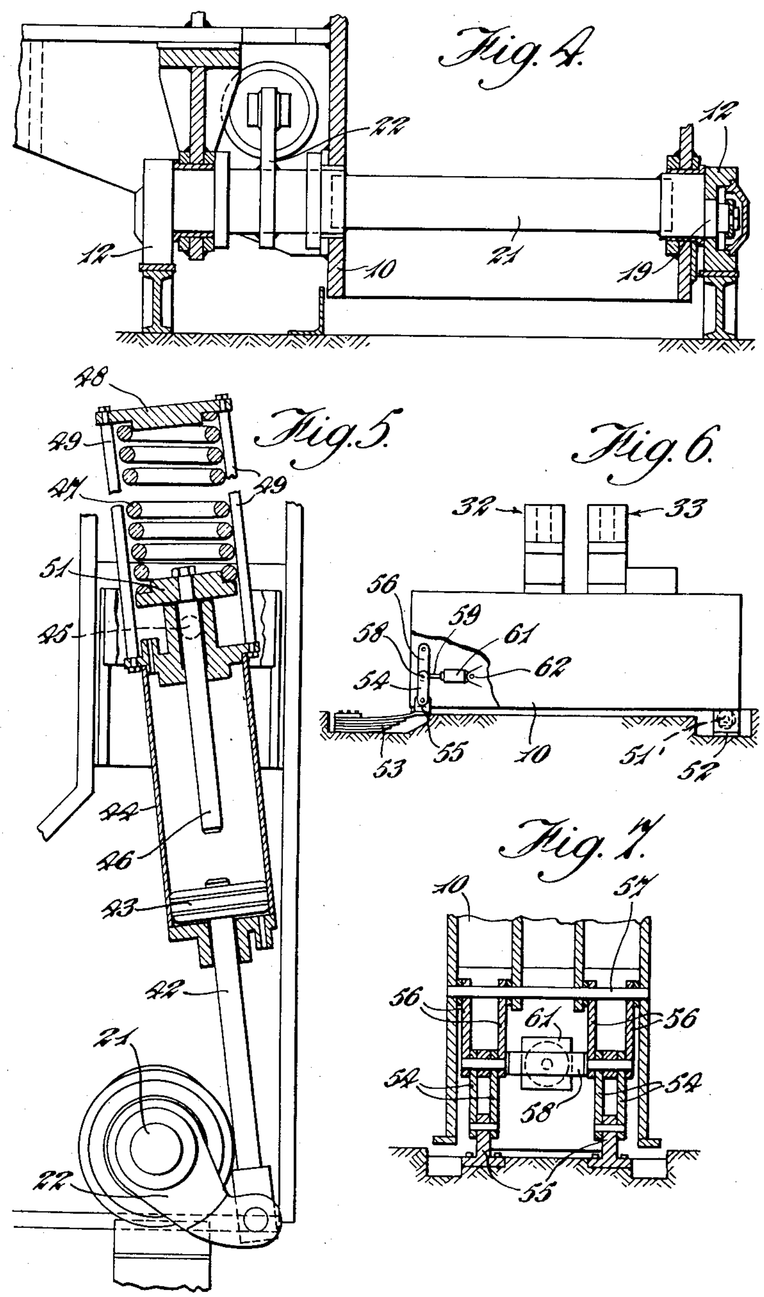
Inventor
Samuel Hunter Gordon
By Stevens, Davis, Miller & Mosher
Attorneys United States Patent Office 2,972,672

Patented Feb. 21, 1961

2,972,672

ELECTRIC RESISTANCE WELDING MACHINES

Samuel Hunter Gordon, Inverness, Scotland, assignor to Resistance Welders Limited, Inverness, Scotland Filed June 16, 1958, Ser. No. 742,118

Claims priority, application Great Britain June 21, 1957

6 Claims. (Cl. 219—101)

This invention relates to electric resistance welding machines for welding together lengths of rail such as railway track rail. In such machine the rails are fed lengthwise through the machine, and consequently each weld, after being completed, has to pass between the clamping members which held one section of rail during the welding operation. It is essential that the clamping members should be moved clear of the rail during the feed movement, since there is protruding upset metal around the weld which would scratch and rapidly wear the surfaces of the clamping members if it came in contact therewith. It has therefore been the practice hitherto to make all the clamping members movable in the machine so that they can be withdrawn clear of the rail when released.

The clamping pressures used in rail welding machines are high, and necessitate a high degree of rigidity in the frames of the machines. The object of the present invention is to provide an improved arrangement of a welding machine in which movement of the lower clamping members to a position clear of the rail when the latter is to be moved in the machine is effected without movement of the said clamping members relative to the machine frame.

According to the invention, in an electric resistance welding machine for welding together lengths of rail the clamping means for grpping the lengths of rail in the machine include lower clamping members and upper clamping members movable vertically relative to said lower clamping members, the said frame being mounted for bodily movement in a manner such that the said lower clamping members move upwardly and downwardly without movement relative to the said frame.

The machine frame is preferably movable about a transverse horizontal axis adjacent one end thereof, means being provided for raising and lowering its other end.

One end of the machine frame may be supported on rollers mounted on eccentric journals carried by a shaft itself journalled in the said frame, means being provided to turn the said shaft about its axis, and the other end of the machine frame may also be mounted on rollers, means being provided for imparting longitudinal movement to the said frame.

Alternatively, the means for raising and lowering the said other end of the machine may comprise a toggle mechanism.

The raising of the machine frame may be effected, and the lowering of the machine frame controlled, by fluid pressure, and springs may be provided to support partially the weight of the machine frame at the said other end.

The invention is hereinafter described with reference to the accompanying drawings, in which:

Figure 1 is a diagrammatic side elevation of one form of welding machine according to the invention, showing the frame in the lowered position;

Figure 2 is a view similar to Figure 1 showing the machine frame raised and the work-clamps open;

Figure 3 is another view similar to Figure 1 showing the machine frame raised and the work-clamps closed;

Figure 4 is a cross-section, on an enlarged scale, through the rollers and roller shaft at the left-hand side of Figures 1, 2 and 3;

Figure 5 is a partial rear view of a machine similar to that shown in Figures 1, 2 and 3, showing, in section, a fluid pressure cylinder device for raising the machine frame, the said device having associated with it a compensating spring;

Figure 6 is a diagrammatic side elevation, similar to Figure 3, of another form of welding machine according to the invention; and Figure 7 is a transverse section through the toggle mechanism shown at the left-hand side of Figure 6.

Referring to Figures 1 to 4, the welding machine comprises a rigid frame 10 supported at one end by a pair of rollers one of which is shown at 11, and at the other end by a pair of rollers 12 both of which are shown in Figure 4, the rollers running on rails 13 extending parallel to the length of the frame 10. The machine frame 10 is thus capable of movement along the rails 13 in the direction of its length, a cylinder 14 pivotally connected to the frame at 15 having mounted therein a piston 16 fixed to a rod 17 pivotally anchored to a fixed bracket 18, so that fluid pressure exerted on one side of the piston 16 moves the frame 10 in one direction, and fluid pressure exerted on the other side of the piston moves the frame 10 in the opposite direction.

The rollers 12, as best shown in Figure 4, are mounted on eccentric journals 19 on the ends of a shaft 21 itself rotatable in the frame 10, so that rotation of the said shaft 21 causes the adjacent end of the frame 10 to move up or down, rocking about the axis of the rollers 11. An arm 22 fixed to the shaft 21 is pivotally coupled to the piston 23 of a piston-and-cylinder unit the cylinder 24 of which is pivotally anchored at 25 to the frame 10, to enable the shaft 21 to be turned about its axis.

The cylinders 14 and 24 are connected through suitable control valves, indicated at 26 and 27 respectively, in Figure 1, to a common source of liquid under pressure, illustrated as a pump 28 driven by an electric motor 29 and drawing liquid from a storage tank 31 in which the liquid is retained when exhausted from either of the cylinders 14 and 24.

The clamp units of the machine are shown at 32 and 33 respectively, the clamp unit 32 being fixed to the frame 10 and the clamp unit 33 being carried by a movable head 34 as is usual in such machines. The lower jaws of the clamps are shown at 35, these jaws being fixed as regards vertical movement relative to the frame 10, or at least one of them being arranged for slight vertical movement for adjusting the relative height of the rails. In view of the need for rigidity, the means for providing vertical movement of the lower jaw or jaws are massive and slow-moving and are not suited to the range and nature of movement required for the purpose of the present invention. The upper jaws 36 are movable by fluid pressure downwardly towards the lower jaws to grip the sections of rail 37, 38 to be welded, between them. The means for operating the upper clamping jaws 36 form no part of this invention and will not be described, but it will be understood that interlock mechanism may be provided so that the said jaws can be moved to the clamping position only when the machine frame is raised, and must be released before the machine frame can be lowered.

Rollers 39, 41, mounted on suitable pillars, are provided to support the rail sections beyond the end of the machine.

In Figure 1, the shaft 21 has been rotated, by movement of the piston 23 towards the anchored end of the cylinder 24, to a position in which the axes of the eccentric journals 19 are in the same horizontal plane as the axis of the shaft 21, and the machine frame 10 is inclined downwardly towards the left. The lower clamp jaws 35 are thus moved well clear of the rail, and the upper clamping jaws 36, having been raised, are also clear of the said rail. The previously formed joint has been moved away to the left, the rail section 37 being that which was last welded, and the section 38 being fed in from the right until the meeting ends of the two sections are near to the centre of the gap between the clamping units 32 and 33. Liquid under pressure is then admitted to one end or other of the cylinder 14 to move the frame 10 and bring the meeting ends of the two rail sections to the centre of the gap between the clamping units, and liquid under pressure is then admitted to the anchored end of the cylinder 24 to move the shaft 21 about its axis until the axes of the eccentric journals 19 are vertically below the said shaft axis. The weight of the frame is then transmitted through the rollers 12 to the rails 13 without exerting any force tending to rotate the said rollers and the piston-and-cylinder unit 23, 24 does not support any of the weight of the machine frame. The frame is now in the position shown in Figure 2, the rail sections 37 and 38 resting on the lower clamping jaws 35. The upper clamping jaws can then be moved to the position shown in Figure 3, to clamp the rail sections in position, and the welding operation is then carried out.

Figure 5 shows an alternative mechanism for turning the shaft 21 to raise and lower the machine frame, the arm 22 on the said shaft being pivotally connected to a rod 42 carrying a piston 43 slidable in a substantially vertically disposed cylinder 44 pivoted at 45 on the machine frame. The cylinder is connected at both ends, through a suitable change-over valve (not shown) to a source of compressed air, so that the piston can be caused to move upwardly or downwardly in the cylinder. With the piston 43 at the lower end of the cylinder, as shown, the axes of the shaft 21 and the rollers 12 are in the same vertical plane and the machine frame is raised, the piston 43 moving upwardly in the cylinder 44 to lower the machine frame. A stem 46 extends co-axially downwardly into the cylinder 44, being urged downwardly by a coiled compression spring 47 abutting at its upper end on a plate 48 connected to the upper end of the cylinder 44 by tension rods 49, and bearing at its lower end on a disc 51 carried by the stem 46. As the piston 43 moves upwardly to cause lowering of the machine frame, it contacts the stem 46 and compresses the spring 47, so that the latter assists in taking the weight of the machine during lowering, and stores energy which assists in the subsequent raising of the frame.

In the welding machine shown in Figures 6 and 7 the rigid frame 10 which supports the fixed clamping unit 32 and the movable head 34 carrying the other clamping unit 33 is supported at its right-hand end on a transverse shaft 51' the ends of which are free to turn in bearing blocks 52 secured to the floor of the building in which the welding machine is housed. At its left-hand end, laminated leaf springs partially support the weight of the machine, the springs being arranged one at the back and one at the front of the machine, and one of them being shown at 53 in Figure 6. A pair of toggle linkages, each comprising twin lower links 54 pivoted to a bracket 55 bolted to the floor, and twin upper links 56 pivoted on a transverse shaft 57 mounted in the machine frame, have a common shaft 58 forming their toggle pivots, the said shaft 58, between the two toggle linkages, having coupled to it the piston rod 59 of a double acting fluid pressure piston-and-cylinder unit 61 the cylinder of which is anchored to the machine frame 10 at 62.

Movement of the toggle linkages from the bent position to the straight position in which it is shown in the drawings raises the machine frame 10 to a horizontal position, and bending of the said linkages lowers the machine frame to an inclined position, thus moving the lower jaws 35 of the clamps away from the rail sections 37, 38, as described with reference to Figures 1 to 4, and, with the upper jaws 36 raised, allowing the rail to be moved endwise without touching the jaws.

The springs 53 take a part of the weight of the machine frame during the lowering of the latter, and store energy which assists in subsequent raising of the said frame. The toggle linkages, being straight when the machine frame is raised, provide a rigid support for the latter which is not dependent on the lifting thrust in the cylinder of the unit 61, to support the load.

Air pressure is conveniently employed in the unit 61, though liquid pressure may be used, and the supply of fluid to the said unit 61 is preferably controlled by a valve so interlocked with valves controlling the supply of fluid pressure to the clamping units that the machine frame can be lowered only when the clamping units are open, and the clamping units can be closed only when the machine frame is raised. The interlocking may be effected electrically, through switches controlling the supply of electric current to solenoids actuating the valves.

I claim:

1. In an electric resistance welding machine for welding together adjoining ends of lengths of rail, a machine frame, clamping units carried by said machine frame and disposed above the frame in spaced relation so as to support the rail lengths on opposite points at their adjoining ends and clamp the lengths of rail to be welded together, each clamping unit including a lower clamping member fixedly upstanding from the frame, and an upper clamping member movable vertically relative to said lower clamping member, means for supporting said frame for longitudinal tilting movement of said frame in an upward and downward direction, and means for moving said supporting means to effect such movement and thereby move said lower clamping members upwardly and downwardly without movement relative to said frame.

2. In an electric resistance welding machine for welding together adjoining ends of lengths of rail, a machine frame, clamping units carried by said machine frame and disposed above the frame in spaced relation so as to support the rail lengths on opposite points at their adjoining ends and clamp the lengths of rail to be welded together, each clamping unit including a lower clamping member fixedly upstanding from the frame, and an upper clamping member movable vertically relative to said lower clamping member, means to support one end of said frame for movement about a transverse horizontal axis, means to support the other end of said frame movable to effect movement of said other end of the frame in an upward and downward direction and means for moving said supporting means to effect such movement and thereby move said lower clamping members upwardly and downwardly without movement relative to said frame.

3. In an electric resistance welding machine for welding together adjoining ends of lengths of rail, a machine frame, clamping units carried by said machine frame and disposed above the frame in spaced relation so as to support the rail lengths on opposite points at their adjoining ends and clamp the lengths of rail to be welded together, each clamping unit including a lower clamping member fixedly upstanding from the frame, and an upper clamping member movable vertically relative to said lower clamping member, a transverse shaft mounted in one end of said frame, rollers mounted on said shaft, rails providing a supporting surface for said rollers, a second transverse shaft mounted in the other end of said frame, eccentric journals on said second shaft, rollers mounted on said eccentric journals and resting on said rails, and means for turning said second shaft about its axis to effect upward and downard movement of the end of the frame in which said second shaft is mounted so as to raise and lower the lower clamping members without movement thereof relative to the frame.

4. In an electric resistance welding machine for welding together adjoining ends of lengths of rail, a machine frame, clamping units carried by said machine frame and disposed above the frame in spaced relation so as to support the rail lengths on opposite points at their adjoining ends and clamp the lengths of rail to be welded together, each clamping unit including a lower clamping member fixedly upstanding from the frame, and an upper clamping member movable vertically relative to said lower clamping member, a transverse shaft mounted in one end of said frame, fixed bearings receiving the ends of said shaft, a toggle mechanism comprising toggle linkages pivoted at one end to the frame, fixed brackets pivotally supporting the other end of the linkages, and power means acting on said toggle linkages to raise and lower the end of the frame to which they are attached by straightening and bending the said toggle linkages.

5. In an electric resistance welding machine for welding together adjoining ends of lengths of rail, a machine frame, clamping units carried by said machine frame and disposed above the frame in spaced relation so as to support the rail lengths on opposite points at their adjoining ends and clamp the lengths of rail to be welded together, each clamping unit including a lower clamping member fixedly upstanding from the frame, and an upper clamping member movable vertically relative to said lower clamping member, a transverse shaft mounted in one end of said frame, fixed bearings receiving the ends of said shaft, a toggle mechanism comprising toggle linkages pivoted at one end to the frame, fixed brackets pivotally supporting the other end of the linkages, and fluid pressure means acting on said toggle linkages to raise and lower the end of the frame to which they are attached by straightening and bending the said toggle linkages, said fluid pressure means including a double-acting piston-and-cylinder unit and means for supplying pressure fluid selectively to the two ends of said unit.

6. In an electric resistance welding machine for welding together adjoining ends of lengths of rail, a machine frame, clamping units carried by said machine frame and disposed above the frame in spaced relation so as to support the rail lengths on opposite points at their adjoining ends and clamp the lengths of rail to be welded together, each clamping unit including a lower clamping member fixedly upstanding from the frame, and an upper clamping member movable vertically relative to said lower clamping member, means to support one end of said frame for movement about a transverse horizontal axis, means to support the other end of said machine frame movable to effect movement of said other end of the frame in an upward and downward direction, resilient means acting upwardly on said other end of the frame, and means for moving said supporting means to effect the bodily movement of the frame and thereby move said lower clamping members upwardly and downwardly without movement relative to the frame.

References Cited in the file of this patent

UNITED STATES PATENTS 2,302,420 Chapman ------------- Mar. 17, 1942